US010406722B2

(12) United States Patent
Myers

(10) Patent No.: US 10,406,722 B2
(45) Date of Patent: Sep. 10, 2019

(54) INDEPENDENTLY DRIVEN DEVICE FOR USE WITH PLASTIC MELT FEED SCREW

(71) Applicant: Jeffrey A. Myers, Onsted, MI (US)

(72) Inventor: Jeffrey A. Myers, Onsted, MI (US)

(*) Notice: Subject to any disclaimer, the term of this patent is extended or adjusted under 35 U.S.C. 154(b) by 327 days.

(21) Appl. No.: 15/272,465

(22) Filed: Sep. 22, 2016

(65) Prior Publication Data

US 2018/0079120 A1    Mar. 22, 2018

(51) Int. Cl.
| | | |
|---|---|---|
| *B29B 7/40* | (2006.01) | |
| *B29B 7/42* | (2006.01) | |
| *B29C 48/375* | (2019.01) | |
| *B29B 7/74* | (2006.01) | |
| *B29C 48/395* | (2019.01) | |
| *B29B 7/82* | (2006.01) | |
| *B29C 48/76* | (2019.01) | |

(52) U.S. Cl.
CPC .............. *B29B 7/407* (2013.01); *B29B 7/408* (2013.01); *B29B 7/421* (2013.01); *B29B 7/429* (2013.01); *B29B 7/7461* (2013.01); *B29C 48/375* (2019.02); *B29C 48/397* (2019.02); *B29B 7/423* (2013.01); *B29B 7/82* (2013.01); *B29C 48/768* (2019.02)

(58) Field of Classification Search
None
See application file for complete search history.

(56) References Cited

U.S. PATENT DOCUMENTS

| | | | | |
|---|---|---|---|---|
| 3,034,421 A | * | 5/1962 | Pence ................... | B65G 69/20 100/147 |
| 3,317,956 A | * | 5/1967 | Lippens ................. | B29B 7/421 425/207 |
| 3,351,694 A | * | 11/1967 | Henry .................... | B29C 47/52 264/211.1 |
| 3,730,492 A | | 5/1973 | Maddock | |
| 4,247,271 A | * | 1/1981 | Yonekura .............. | B29C 35/065 264/236 |
| 4,746,478 A | * | 5/1988 | Fujisaki ............... | B29C 44/3442 264/53 |
| 4,779,989 A | | 10/1988 | Barr | |

(Continued)

OTHER PUBLICATIONS

The Fluxion Mixer; http://www.robertbarr.com/barr-fluxion-mixer.php.

(Continued)

*Primary Examiner* — Jacob T Minskey
*Assistant Examiner* — Baileigh Kate Darnell
(74) *Attorney, Agent, or Firm* — William J. Clemens; Shumaker, Loop & Kendrick, LLP

(57) ABSTRACT

A plastic melt machine includes a feed screw rotatably mounted in a barrel and driven in rotation about a longitudinal screw axis of the feed screw by a screw drive to plasticize material, and an apparatus for driving a device independently of the feed screw. The device can be any rotatable device associated with the feed screw wherein the device is rotatable about a drive axis and is in fluid communication with the barrel to receive the plasticized material. The drive axis is one of parallel to and offset from the screw axis and extending at an angle relative to the screw axis. A drive shaft couples the device to the device drive for rotating the device independently of the rotation of the feed screw by the screw drive.

20 Claims, 4 Drawing Sheets

(56) References Cited

U.S. PATENT DOCUMENTS

| | | | | |
|---|---|---|---|---|
| 4,925,313 A | * | 5/1990 | Nunn | ................... B29B 7/429 |
| | | | | 366/319 |
| 5,988,866 A | | 11/1999 | Barr | |
| 6,254,266 B1 | | 7/2001 | Barr et al. | |
| 6,454,454 B1 | | 9/2002 | Barr | |
| 6,599,004 B2 | | 7/2003 | Barr | |
| 6,627,134 B2 | * | 9/2003 | Thomson | ............ B29C 45/1645 |
| | | | | 264/255 |
| 2006/0083105 A1 | * | 4/2006 | MacDonald | .......... B29C 45/581 |
| | | | | 366/80 |

OTHER PUBLICATIONS

Plastics Technology Single-Screw Mixing 101; http://www.ptonline.com/columns/single-screw-mixing-101.

* cited by examiner

INDEPENDENTLY DRIVEN DEVICE FOR USE WITH PLASTIC MELT FEED SCREW

FIELD OF THE INVENTION

This invention relates to an apparatus positioned at the downstream end of the power driven feed screw in a plastic melt machine or apparatus.

BACKGROUND OF THE INVENTION

This section provides background information related to the present disclosure which is not necessarily prior art.

A wide variety of apparatuses have been proposed for the fluxing and mixing of thermoplastic materials. The essential requirements for such apparatus include rapid fluxing or melting of the material and efficient mixing of the material components into a homogeneous blend, both at an effectively high throughput rate. Whereas some prior apparatuses are capable of satisfying the desired fluxing and mixing requirements, they are incapable of delivering the necessary throughput rate. Other prior apparatuses sacrifice fluxing and/or mixing efficiency in order to provide the required throughput rate.

There are several different plastic melt mixing devices that can be attached to the feed screw for the mixing of thermoplastic materials with high fluxing and mixing efficiency and are capable of delivering a high material throughput rate. Dispersive mixing applies force to the materials and thus requires drive energy that ends up in the polymer mix to help melt it and/or raise its temperature. Consequently, dispersive mixing assists or adds to the melting capacity of the screw. In addition, tight clearances often function as a "dam," restricting unmelted polymer from passing through until reduced in size or melted. Many feed screw designs would discharge unmelted polymer at almost all speeds without a dispersive mixer. The "Maddock" mixer is an example of a mixer that is primarily dispersive, with lesser distributive characteristics.

The U.S. Pat. No. 3,730,492 describes the "Maddock" mixing head. An extruder heats thermoplastic material to a flowable condition, longitudinally advancing the heated material under pressure toward the discharge end with a rotating extrusion feed screw having the Maddock mixer head at the downstream end thereof. The mixer head divides the heated material into a plurality of streams and passes the streams through a plurality of longitudinal mixing passages thereby passing the plurality of individual streams of the partially fluxed melt through high shear zones between the mixer head and the barrel of the extruder, and then passes the fluxed melt into the interior of the mixer head and therethrough to the discharge end of the mixer head. In summary, the Maddock mixer passes melt over a very narrow clearance where it experiences high shear for a high degree of dispersive mixing. The melt is divided several times and reoriented to provide some distributive mixing.

Although distributive mixing also requires some drive power, it is generally small enough to have a very minor effect on the melt temperature. A "Saxton" style mixer is an example of a mixer that is mostly distributive with minor dispersive characteristics. In the Saxton mixer, melt is divided many times and recombined with numerous reorientations to provide mostly distributive mixing.

An "Eagan" style mixer combines strong dispersive and distributive characteristics. All of the flights are undercut so there is a lot more dispersive and distributive mixing than with the Maddock mixing section. In the Egan mixer, a reduced diameter provides multiple high-shear regions as well as leakage flow and many reorientations for high levels of both dispersive and distributive mixing.

U.S. Pat. No. 4,779,989, issued to Robert A. Barr, describes a mixer assembly for mixing fluid material in the bore of a barrel including a structure for mixing and pumping toward its outlet end the material fed thereto. A stator assembly is fixed in the barrel having outer cylindrical surface portions conforming substantially to the surface of the bore and having a stator bore provided with a groove-interrupted inner surface, and a driven rotor member has a groove-interrupted outer surface confronting the inner stator surface. The inner stator surface and outer rotor surface each have continuous helical grooves cut therein along a helical path which changes in depth with length from a small minimum depth to a larger maximum depth but never disappearing and having a plurality of axially spaced circumferential grooves at planes perpendicular to the bore center axis subdividing such surfaces into axially spaced serially arranged mixer sections with portions of the helical grooves extending between the circumferential grooves defining each section.

U.S. Pat. No. 5,988,866, issued to Robert A. Barr, describes a mixer for plasticable resins having a fixedly positioned heated barrel with a power driven feed screw mounted axially in the barrel bore, and a driven rotor axially aligned with and extending in a downstream direction from the downstream end of power driven screw. A series of elongated rotor flow transfer cavities are in the outer surface of the rotor. The rotor flow transfer cavities extending inwardly and are arranged in a plurality of axially aligned rows and a plurality of annular rows concentric to the axis of the rotor. A floating sleeve is coaxially positioned over the power driven rotor and interposed between the rotor and the barrel so as to be capable of independent rotation relative to both the power driven rotor and the barrel. The floating sleeve has a plurality of parallel outwardly extending ring flanges extending radially outwardly and inwardly facing a plurality of annular and elongated in cross-section outer sleeve flow channels each having an upstream end and a downstream end provided between adjacent ring flanges. A series of outflow apertures extend through the floating sleeve and communicate on opposite ends with the upstream end of an elongated outer sleeve flow channel of the floating sleeve flow channel and the downstream end of one of the elongated rotor flow transfer cavities of the rotor.

U.S. Pat. No. 6,254,266, issued to Robert A. Barr and Jeffrey A. Myers, describes an extruder-mixer having a plurality of rotor rings provided on the downstream end of a motor driven feed shaft mounted for rotation in a conventional heated barrel or stator. The rings comprise a plurality of spaced driven rotor rings spaced apart from each other and a plurality of non-driven but rotatable floating rings interleaved between each pair of driven rotor rings. Both rings have parallel upstream and downstream faces between which polymer flow passageways extend so that the polymer melt moves downstream first through one type of ring followed by movement through the other type of ring and the viscosity of the melt causes the rotatable floating rings to be rotated by the driven rings at a slower speed than the driven rings so that shearing force on the melt effects mixing of the melt.

The above-described plastic melt mixing devices all are attached to the feed screw for rotation. Since the rotational speed of the mixer attached to the screw is the same as the screw speed the mixing effect cannot be changed without a redesigned mixing head. This can be a problem, especially with large extruders wherein the screw rotational velocity (i.e. RPM) is relatively low compared to smaller diameter screws. This leads to less of a mixing effect. To provide for an adjustable mixing effect with a given design mixer it would be desirable to have the mixer rotational velocity (RPM) adjustable independent of the extruder screw.

In addition to mixing devices, it would be beneficial to drive other devices independently of the feed screw. Such devices can include, for example, vent sections, injection port sections, melting sections and temperature gradient reduction sections.

BRIEF SUMMARY OF THE INVENTION

The purpose of this invention is to provide an apparatus having a device that is rotated independently from the feed screw. In concordance with the instant disclosure, this purpose is accomplished by driving the device separately from the feed screw so that the rotational speed of the device can be changed independently of the feed screw rotational speed.

According to the invention, the plastic melt inlet and the outlet of the device are in line with the existing feed screw and the process machinery downstream. This configuration makes it much easier to add the independently driven device to an existing process line, be it sheet, blown film, compounding, etc., to control mixing and shear rate. For example, the device can be used to add liquid color material without affecting the conveying of the solids. The device also can be adapted to a two stage shot put injection molding application to replace the typical "static" mixers. The device would be positioned between the end of the extruder screw and the shot pot.

In one embodiment of the invention, the rotational axis of the device is parallel to but offset from the rotational axis of the feed screw. In another embodiment of the invention, the rotational axis of the device is offset by extending at an angle to the rotational axis of the feed screw. In the following, these configurations are referred to as "offset axis" devices.

An apparatus for driving a device of a plastic melt machine independently of a feed screw is used with the feed screw being rotatably mounted in a barrel and driven in rotation about a longitudinal screw axis of the feed screw by a screw drive to plasticize material. The apparatus includes the device being rotatable about a drive axis, the apparatus being in fluid communication with the barrel to receive the plasticized material, and a device drive coupled to the device for rotating the device independently of the rotation of the feed screw by the screw drive. The device can be a mixing device or any other device typically used with a feed screw.

The device can be rotated by the device drive about a device drive axis that is parallel to and offset from the screw axis. The apparatus includes an adapter block having a passage formed therein, the passage being in fluid communication with the barrel, the device being rotatably received in the passage and attached to a drive shaft coupled to the device drive. The passage is can be U-shaped, or any other suitable shape, and has an inlet portion and an outlet portion, both of the portions being axially aligned with the screw axis.

The device can be rotated by the device drive about a device drive axis that extends at an angle relative to the screw axis. The apparatus includes an adapter block having a V-shaped passage, or any other suitable shape, formed therein, the passage being in fluid communication with the barrel, the device being rotatably received in the passage and attached to a drive shaft coupled to the device drive. The passage has an inlet portion and an outlet portion, both of the portions being axially aligned with the screw axis.

The device drive can include an electric motor coupled to the device. The device drive can further include a driving pulley rotated by the electric motor, a driven pulley coupled to the device by a drive shaft and an endless belt coupling the driving pulley to the driven pulley.

BRIEF DESCRIPTION OF THE SEVERAL VIEWS OF THE DRAWING

The above as well as other advantages of the invention will become readily apparent to those skilled in the art from the following detailed description of a preferred embodiment when considered in the light of the accompanying drawings in which.

DETAILED DESCRIPTION OF THE INVENTION

The following detailed description and appended drawings describe and illustrate various exemplary embodiments of the invention. The description and drawings serve to enable one skilled in the art to make and use the invention, and are not intended to limit the scope of the invention in any manner. In respect of the methods disclosed, the steps presented are exemplary in nature, and thus, the order of the steps is not necessary or critical.

Figure 1:
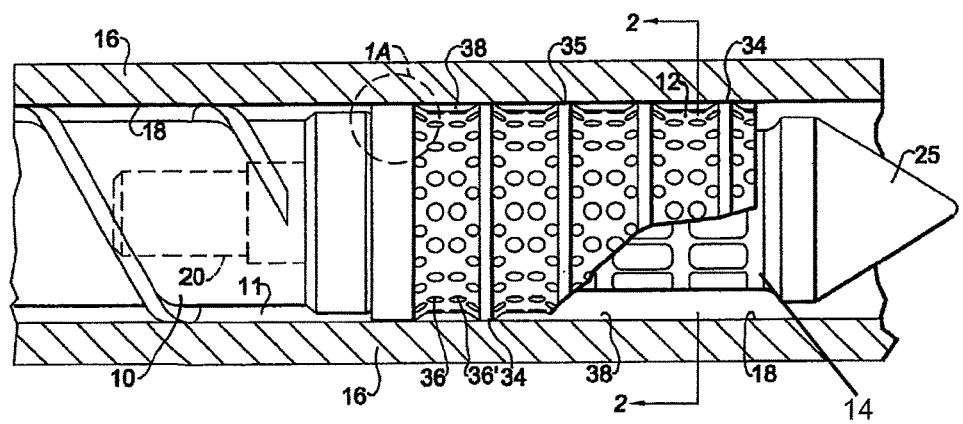
FIG. 1 is a side elevation view of the discharge end portion of the screw section of a single screw extruder assembly according to the prior art having a mixing device connected to the end of the feed screw with the barrel of the extruder assembly being shown in section.

Reference is made to FIG. 1, corresponding to FIG. 1 of U.S. Pat. No. 5,988,866, showing a conventional extruder feed screw 10 and FIG. 2, corresponding to FIG. 8 of U.S. Pat. No. 5,988,866, showing a rotor 14 of a mixing device attached to the feed screw 10. The mixing device includes a floating sleeve 12 coaxially positioned relative to the feed screw 10 and the rotor 14 fixedly mounted on and attached to the downstream end of the feed screw 10. The floating sleeve 12 surrounds and is coaxial with an axis 24 of rotor 14 which is coextensive with an axis of the feed screw 10. The floating sleeve 12 is free to rotate about the axis 24 of the rotor 14. Also, the sleeve 12 and the rotor 14 are capable of limited axial movement relative to each other. The aforementioned components are mounted in a conventional cylindrical barrel 16 that is heated by conventional means (not shown) and which includes an inwardly facing cylindrical surface 18 as shown in FIG. 1.

Figure 2:
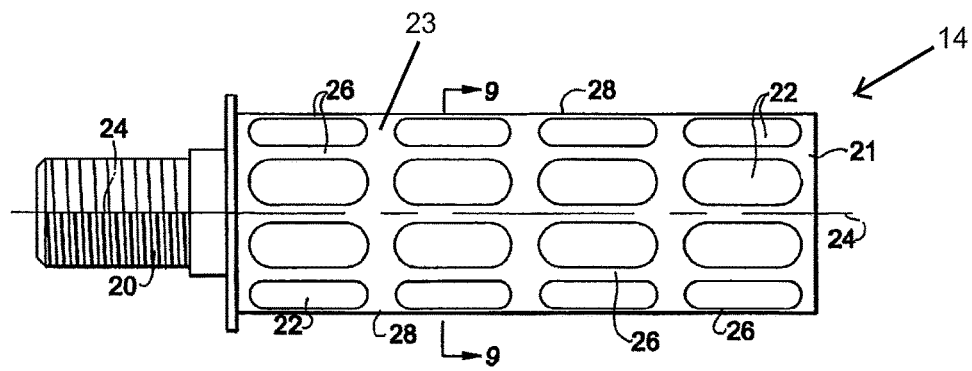
FIG. 2 is a side elevation view of the prior art mixing device rotor shown in FIG. 1.

The rotor 14 has a stub member including a mounting stub 20 received in an axial aperture in the downstream end of the feed screw 10 as shown in FIG. 1. A cylindrical body portion 21 is unitarily formed with the mounting stub 20 and includes an outer surface 23 provided with a plurality of elongated rotor flow transfer cavities 22 arranged in a series of annular rows about the periphery of the rotor. Each annular row of rotor flow transfer cavities 22 is concentric with respect to the axis 24 of the rotor 14 which is itself coextensive with the axis of the feed screw 10. Additionally, the elongated rotor flow recesses 22 are arranged in axially parallel linear rows that are parallel to the axis 24 as shown in FIG. 2. The axially parallel linear rows of the rotor flow recesses 22 are separated by linear ribs 26 extending parallel to the axis 24. Similarly, the annular rows extend about the periphery of the rotor 14 in a concentric manner with respect to the axis 24 and are separated by annular rotor rings 28 as shown in FIG. 2. A removable tip 25 is axially received and threaded into the downstream end of the rotor 14 as shown in FIG. 1.

Since the rotor 14 is attached to the downstream end of the feed screw 10, the rotor 14 and the screw 10 will rotate at the same speed. Thus, the mixing effect of the mixing device cannot be changed without a redesigned mixing head. This can be a problem, especially with large extruders wherein the screw rotational velocity (i.e. RPM) is relatively low compared to smaller diameter screws. This leads to less of a mixing effect. To provide for an adjustable mixing effect with a given design mixer the invention described below provides a mixer rotational velocity (RPM) that is adjustable independently of the feed screw rotational velocity.

Figures 3, 4:
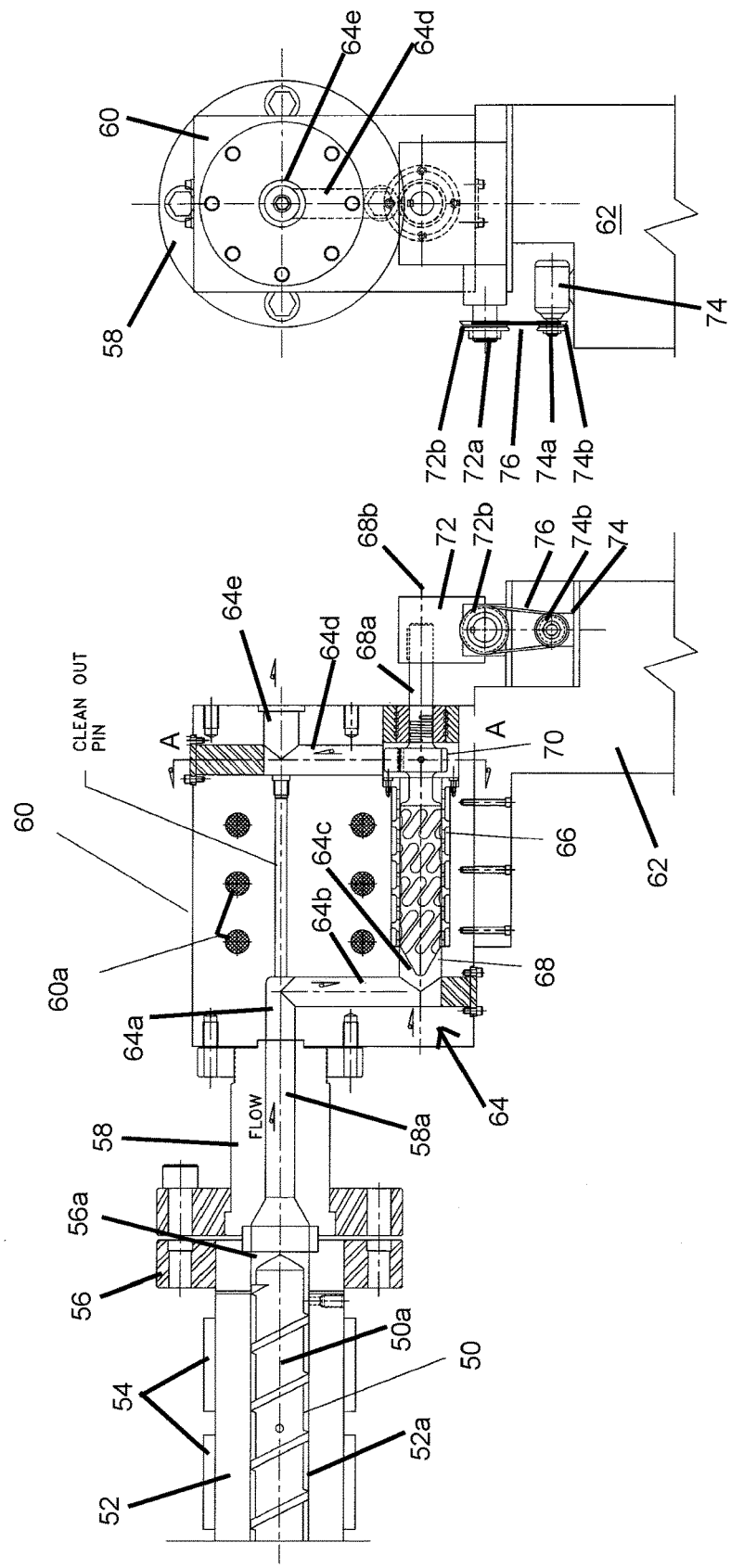
FIG. 3 is a sectional side elevation view of the discharge end portion of the screw section of a single screw extruder assembly having an independently driven mixing apparatus according to the invention wherein the rotational axis of the mixing device is parallel to but offset from the rotational axis of the feed screw.
FIG. 4 is an end elevation view of the assembly shown in FIG. 3.

FIG. 3 and FIG. 4 show the discharge end portion of the screw section of a single screw extruder assembly having an independently driven "offset axis" device according to the invention. The device is included in an "offset axis" mixing apparatus in which the rotational axis of the mixing device is parallel to but offset from the rotational axis of the feed screw. A conventional feed screw 50 is mounted in a conventional cylindrical barrel 52 that is heated by a plurality of external heaters 54. A flange 56 is attached to the outlet end of the barrel 52 and has a cylindrical passage 56a formed therethrough for receiving melted plastic material from an interior axial bore 52a of the barrel 52. An end cap 58 is attached to the flange 56 and has a cylindrical passage 58a formed therethrough for receiving melted plastic material from the passage 56a. The passages 56a and 58a are coaxial with a longitudinal axis of rotation 50a of the feed screw 50 and the bore 52a of the barrel 52.

An adapter block 60, included in an apparatus according to the invention, is mounted on a support base 62 and is attached to the end cap 58 opposite the flange 56. The block 60 can include a plurality of embedded cartridge heaters 60a for controlling the temperature of the melted plastic material passing therethrough. A generally U-shaped cylindrical passage 64 is formed in the adapter block 60. However, the passage can be of any suitable shape. A first passage portion 64a of the passage 64 is coaxial with the passage 58a and has an inlet end in fluid communication with an outlet end of the passage 58a. A second passage portion 64b extends axially transverse to the axis of the first passage portion 64a and has an inlet end in fluid communication with an outlet end of the first passage portion 64a. A third passage portion 64c of the passage 64 extends axially parallel with the axis of the first passage portion 64a, offset in a vertical direction, and has an inlet end in fluid communication with an outlet end of the second passage portion 64b. A fourth passage portion 64d of the passage 64 extends axially parallel with the axis of the second passage portion 64b, offset in a horizontal direction, and has an inlet end in fluid communication with an outlet end of the third passage portion 64c. A fifth passage portion 64e of the passage 64 is coaxial with the first passage portion 64a and has an inlet end in fluid communication with an outlet end of the fourth passage portion 64d. The melted plastic material exits the apparatus at an outlet of the fifth passage portion 64e, which outlet is coaxial with the outlet of the barrel 52.

The third passage portion 64c has a larger diameter than the other passage portions of the passage 64 for receiving a rotatable device. Shown in FIG. 3 as the rotatable device is a FLUXION™ mixer available from Robert Barr, Inc. of Virginia Beach, Va. and Onsted, Mich. However, other devices can be used. The mixing device includes a stator 66 mounted in the third passage portion 64c and a rotor 68 rotatably positioned inside the hollow stator 66. The rotor 68 has an axially extending stub or drive shaft 68a connected to a pump impeller 70 positioned in a space 64f at the junction of the third passage portion 64c and the fourth passage portion 64d. The drive shaft 68a extends through the impeller 70 to terminate in a right angle gear reducer 72 mounted on the base 62. The rotor 68 and the drive shaft 68a rotate about a device drive axis of rotation 68b that is parallel to but offset from the screw axis of rotation 50a.

The gear reducer 72 has an input shaft 72a on which is mounted a driven pulley 72b. A device drive in the form of an electric motor 74 is mounted on the base 62 and has an output shaft 74a on which is mounted a driving pulley 74b. The pulleys 72b and 74b are connected by an endless belt 76. When the device drive motor 74 is actuated, the driving pulley 74b is rotated and, through the belt 76, rotates the driven pulley 72b. Rotation of the pulley 72b causes the drive shaft 68a and the rotor 68 to rotate thereby mixing any plastic material in the third passage portion 64c. Since the extruder screw 50 is rotated by a conventional separate screw drive 110 (FIG. 3), the rotational speed of the mixing device rotor 68 can be controlled independently of the rotational speed of the extruder screw 50.

Figure 5:
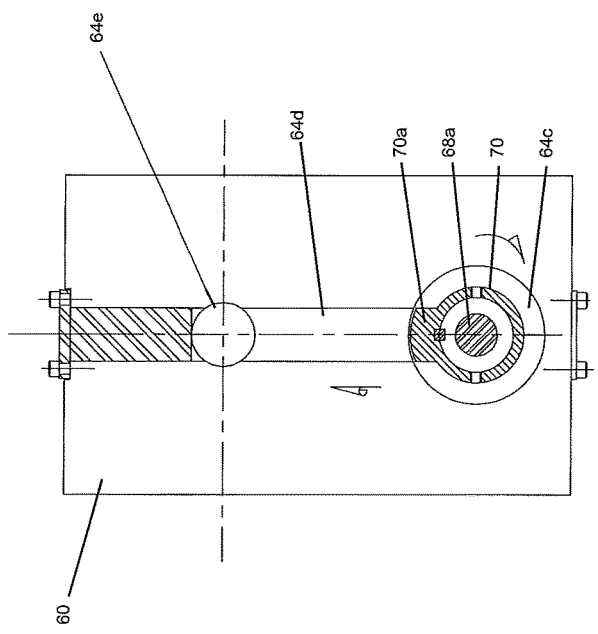
FIG. 5 is a cross-sectional view of the adapter block taken along the line A-A in FIG. 3.

As seen in FIG. 5, the pump impeller 70 has a tubular body forming an axial aperture for receiving the drive shaft 68a. Any suitable method for attaching the impeller 70 to the drive shaft 68a for co-rotation can be used; e.g. press fit or set screw. The body of the impeller 70 is smaller in diameter than the space 64f so that a free portion of the space fills with the plastic material being forced through the mixing device. A lobe 70a extends radially from the periphery of the impeller body terminating adjacent a wall of the space 64f. As the impeller 70 is rotated, plastic material received from the third passage portion 64c is forced or pumped into the fourth passage portion 64d by the rotating impeller lobe 70a.

Figure 6:
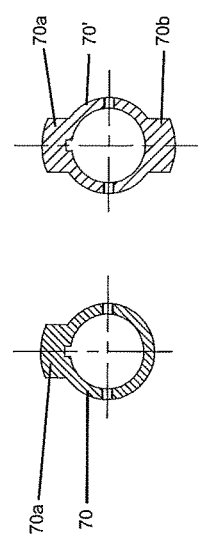
FIG. 6 is a cross-sectional view of an alternate embodiment pump impeller for use in the assembly shown in FIGS. 3-5.

An alternate embodiment pump impeller 70' is shown in FIG. 6. The configuration of the pump impeller 70' is similar to the pump impeller 70, but a second lobe 70b extends radially from the periphery of the impeller body opposite the first lobe 70a. The pump impeller can have any number of the lobes depending on the desired pumping characteristics.

Figure 7:
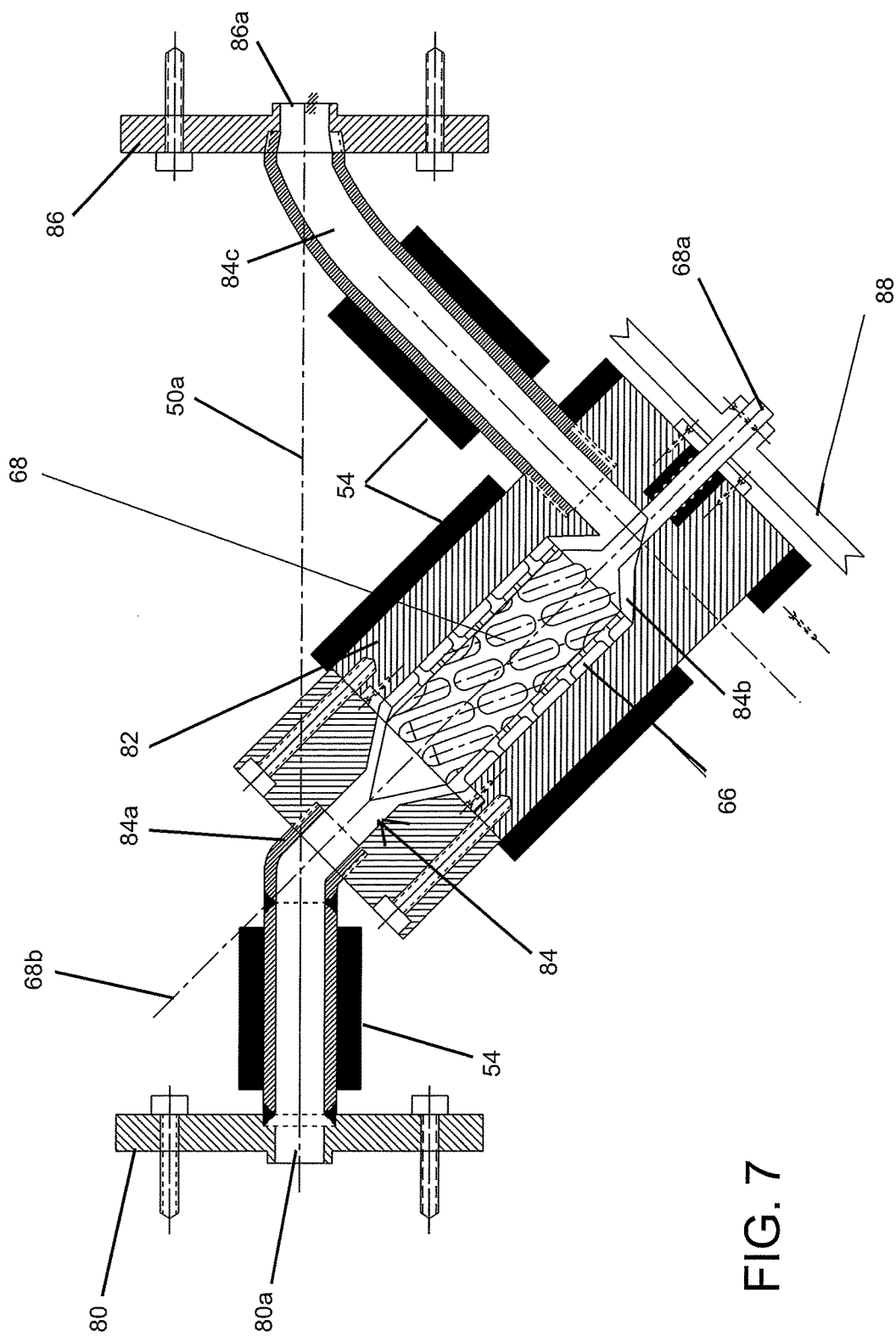
FIG. 7 is a cross-sectional side elevation view of an alternate embodiment independently driven mixing apparatus according to the invention wherein the rotational axis of the mixing device is at an angle to the rotational axis of the feed screw.

FIG. 7 shows an alternate embodiment independently driven "offset axis" device according to the invention wherein the rotational axis of the mixing device is at an angle to the rotational axis of the feed screw. An end cap 80 is configured to be attached to the flange 56 shown in FIG. 3 and has a cylindrical passage 80a formed therethrough for receiving melted plastic material from the passage 56a. The passages 56a and 80a are coaxial with the axis of rotation 50a of the extruder screw 50 and the bore 52a of the barrel 52. However, an outlet end portion 80b of the passage 80a extends at an angle to the axis of rotation 50a and is connected to an inlet of an adapter block 82.

The adapter block 82 is included in the alternate embodiment "offset axis" apparatus according to the invention and is attached to the end cap 80 opposite the flange 56 (FIG. 3). The end cap 80 and the adapter block 82 can include a plurality of external heaters 54 for controlling the temperature of the melted plastic material passing therethrough. A generally V-shaped cylindrical passage 84 is formed in the adapter block 82. A first passage portion 84a of the passage 84 is coaxial with the passage portion 80b and has an inlet end in fluid communication therewith. A second passage portion 84b extends axially from the first passage portion 84a and has an inlet end in fluid communication with an outlet end of the first passage portion 84a. A third passage portion 84c of the passage 84 extends axially at a right angle from the second passage portion 84b and has an inlet end in fluid communication with an outlet end of the second passage portion 84b. The melted plastic material exits the mixing apparatus at an outlet cap 86 having an outlet aperture 86a coaxial with the screw axis of rotation 50a. An outlet end of the third passage portion 84c is curved to mate with the outlet aperture 86a.

The second passage portion 84b has a larger diameter than the other passage portions 84a and 84c of the passage 84 for receiving a rotatable device. The device can be the one shown in FIG. 3 having the stator 66 mounted in the second passage portion 84b and the rotor 68 rotatably positioned inside the hollow stator 66. The rotor 68 has an axially extending stub or drive shaft 68a that extends through an end wall of the block 82 and on which a driven pulley 88 is mounted. The pulley 88 can be driven by any suitable drive such as the device drive motor 74, the pulley 74a and the belt 76 shown in FIG. 3. The rotor 68 rotates about the axis of rotation 68b that extends at an angle to the screw axis of rotation 50a when the motor 74 is actuated. Rotation of the pulley 88 causes the drive shaft 68a and the rotor 68 to rotate thereby mixing any plastic material in the second passage portion 84b. Since the feed screw 50 is rotated by a separate motor, similar to the screw drive 110 shown in FIG. 3, the rotational speed of the device rotor 68 can be controlled independently of the rotational speed of the feed screw 50.

Although a mixing device is shown and described as examples of independently driven rotational devices according to the invention, other devices associated with plastic melting machines can be similarly driven. Such devices can include, without limitation, injection port sections, melting sections and temperature gradient reduction sections.

In accordance with the provisions of the patent statutes, the invention has been described in what is considered to represent its preferred embodiment. However, it should be noted that the invention can be practiced otherwise than as specifically illustrated and described without departing from its spirit or scope.

The invention claimed is:

1. An apparatus for use in a plastic melt machine, the apparatus comprising:
    an adapter block being in fluid communication with a barrel of the plastic melt machine to receive material plasticized by rotation of a feed screw rotatably mounted in the barrel;
    a device positioned in the adapter block and being rotatable about a drive axis offset from a longitudinal screw axis of the feed screw; and
    a device drive coupled to the device for rotating the device independently of the rotation of the feed screw by a screw drive of the plastic melt machine.

2. The apparatus according to claim 1 wherein the device is one of a mixing device, screw vent section, an injection port section, a melting section or a temperature gradient section.

3. The apparatus according to claim 1 wherein the drive axis is parallel to and offset from the screw axis.

4. The apparatus according to claim 3 wherein the adapter block has a passage formed therein, the passage being in fluid communication with the barrel, the device being rotatably received in the passage and attached to a drive shaft coupled to the device drive.

5. The apparatus according to claim 4 wherein the passage is U-shaped and has an inlet portion and an outlet portion, both of the inlet portion and the outlet portion being axially aligned with the screw axis.

6. The apparatus according to claim 1 wherein the drive axis extends at an angle relative to the screw axis.

7. The apparatus according to claim 6 wherein the adapter block has a V-shaped passage formed therein, the passage being in fluid communication with the barrel, the device being rotatably received in the passage and attached to a drive shaft coupled to the device drive.

8. The apparatus according to claim 7 wherein the passage has an inlet portion and an outlet portion, both of the inlet portion and the outlet portion being axially aligned with the screw axis.

9. The apparatus according to claim 1 wherein the device drive includes an electric motor coupled to the device.

10. The apparatus according to claim 9 wherein the device drive includes a driving pulley rotated by the electric motor, a driven pulley coupled to the device by a drive shaft and an endless belt coupling the driving pulley to the driven pulley.

11. An apparatus for use in a plastic melt machine, the apparatus comprising:
    an adapter block being in fluid communication with a barrel of the plastic melt machine to receive material plasticized by rotation of a feed screw rotatably mounted in the barrel;
    a device positioned in the adapter block and being rotatable about a drive axis offset from a longitudinal screw axis of the feed screw;
    a drive shaft coupled to the device; and
    a device drive coupled to the drive shaft for rotating the device independently of the rotation of the feed screw by a screw drive of the plastic melt machine.

12. The apparatus according to claim 11 wherein the device is one of a mixing device, a screw vent section, an injection port section, a melting section or a temperature gradient reduction section.

13. The apparatus according to claim 11 wherein the drive axis is parallel to and offset from the screw axis.

14. The apparatus according to claim 11 wherein the drive axis extends at an angle relative to the screw axis.

15. The apparatus according to claim 11 wherein the device drive includes an electric motor coupled to the drive shaft.

16. The apparatus according to claim 15 wherein the device drive includes a driving pulley rotated by the electric motor, a driven pulley coupled to the device by the drive shaft and an endless belt coupling the driving pulley to the driven pulley.

17. An apparatus for use in a plastic melt machine, the apparatus comprising:

an adapter block having a passage in fluid communication with a barrel of the plastic melt machine to receive material plasticized by rotation of a feed screw rotatably mounted in the barrel;

a device positioned in the passage and being rotatable about a drive axis offset from a longitudinal screw axis of the feed screw;

a drive shaft coupled to the device; and a device drive coupled to the drive shaft for rotating the device independently of the rotation of the feed screw by a screw drive of the plastic melt machine.

18. The apparatus according to claim 17 wherein the drive axis is parallel to and offset from the screw axis.

19. The apparatus according to claim 18 wherein the passage is U-shaped and has an inlet portion and an outlet portion, both of the inlet portion and the outlet portion being axially aligned with the screw axis.

20. The apparatus according to claim 17 wherein the drive axis extends at an angle relative to the screw axis and the passage is V-shaped and has an inlet portion and an outlet portion, both of the inlet portion and the outlet portion being axially aligned with the screw axis.

* * * * *